(12) United States Patent
Kozar et al.

(10) Patent No.: US 8,816,543 B2
(45) Date of Patent: Aug. 26, 2014

(54) FLEXIBLE MAGNET DIRECTIONAL STIFFENING METHODS

(75) Inventors: Michael P. Kozar, Mercer Island, WA (US); John R. Hull, Sammamish, WA (US); John A. Mittleider, Kent, WA (US); Mark S. Wilenski, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 246 days.

(21) Appl. No.: 13/438,083

(22) Filed: Apr. 3, 2012

(65) Prior Publication Data

US 2013/0257186 A1    Oct. 3, 2013

(51) Int. Cl.
*H02K 15/12* (2006.01)

(52) U.S. Cl.
USPC ............................................. 310/44; 29/596

(58) Field of Classification Search
USPC ........................................ 310/44, 45; 29/596
See application file for complete search history.

(56) References Cited

U.S. PATENT DOCUMENTS

| | | | |
|---|---|---|---|
| 5,214,981 A | | 6/1993 | Weinberger et al. |
| 5,477,092 A | | 12/1995 | Tarrant |
| 5,546,648 A | | 8/1996 | Tarrant |
| 5,760,506 A | | 6/1998 | Ahlstrom et al. |
| 6,873,235 B2 | | 3/2005 | Fiske et al. |
| 6,995,489 B2 | * | 2/2006 | Ehrhart et al. ............ 310/156.31 |
| 7,714,479 B2 | * | 5/2010 | Seneff et al. .................. 310/268 |
| 7,972,450 B2 | * | 7/2011 | Komuro et al. ............... 148/302 |
| 2010/0231075 A1 | | 9/2010 | Han et al. |

OTHER PUBLICATIONS

Mulcahy, T.M., et al., "Test Results of 2-kWh Flywheel Using Passive PM and HTS Bearings," IEEE Trans. Appl. Supercond., 2001, vol. 11, pp. 1729-1732.
Pantano, A., et al., "Mechanics of Deformation of Single- and Multi-Wall Carbon Nanotubes," J. Mechanics and Physics of Solids, 2004, vol. 52, pp. 789-821.
Pathak, S.K., et al., "Fabrication of High Performance Y-123/Y-24111/Ag Single Grain Composites," Physica C, 2009, vol. 469, pp. 1173-1176.
Pathak, S.K., et al., "Processing and Properties of Large Grain Y—Ba—Cu—O Containing Y2Ba4CuWOY (Y-24W1) and Ag Second Phase Inclusions," J. Appl. Phys., 2009, vol. 106, 0639.
Sammalkorpi, M., et al., "Mechanical Properties of Carbon Nanotubes With Vacancies and Related Defects," Physical Review B, 2009, vol. 70, 245416.
Shokrieh, M.M. and Rafiee, R., "Investigation of Nanotube Length Effect on the Reinforcement Efficiency in Carbon Nanotube Based Composites," Composite Structures, 2010, vol.
Strasik, M., et al., "Design, Fabrication, and Test of a 5-kWh/100-kWh Flywheel Energy Storage Utilizing a High-Temperature Superconducting Bearing," IEEE Trans. Appl., 2007.
Strasik, M., et al., "Performance of a Conduction-Cooled High-Temperature Superconducting Bearing," Mat. Sci. Eng. B, 2008, vol. 151, pp. 195-198.

(Continued)

*Primary Examiner* — Nguyen N Hanh
(74) *Attorney, Agent, or Firm* — Smith Moore Leatherwood LLP

(57) ABSTRACT

Magnets and methods of their manufacture are disclosed for use in flywheel assemblies, such that the magnets comprise oriented fibers, such as, for example, axially-oriented fibers in a flexible rotor magnet composition to predictably allow the magnet to expand dimensionally upon rotation only in a predetermined and predictable fashion while maintaining critical contact with a rotor surface.

26 Claims, 3 Drawing Sheets

(56) References Cited

OTHER PUBLICATIONS

Strasik, M., et al., "Overview of Boeing Flywheel Energy-Storage Systems With High-Temperature Superconducting Bearings," Supercond. Sci. Technol., 2010, vol. 23, 034021.

Strubhar, J.L., et al., "Lightweight Containment for High-Energy Rotating Machines," IEEE Trans. Magn., 2003, vol. 39, pp. 378-383.

Huhtala, M., et al., "Improved Mechanical Load Transfer Between Shells of Multiwalled Carbon Nanotubes," Physical Review B, 2004, vol. 70, 045404.

Hull, J.R., et al., "Velocity Dependence of Rotational Loss in Evershed-Type Superconducting Bearings," Appl. Phys. Lett., 1997, vol. 70, pp. 655-657.

Hull, J.R. "Superconducting Levitation," Encyclopedia of Electrical and Electronics Engineering, 1999, vol. 20, pp. 729-734 (ed. J. G. Webster), John Wiley and Sons, New York.

J. Hull, "Superconducting Bearings," Supercond. Sci. Technol., 2000, vol. 13, pp. R1-R14.

Hull, J.R. and Murakami, M., "Applications of Bulk High-Temperature Superconductors," Proceedings IEEE, 2004, vol. 92, pp. 1705-1718.

Hull, J., et al., "High Rotational-Rate Rotors With High-Temperature Superconducting Bearings," IEEE Trans. Appl. Supercond., 2009, vol. 19, pp. 2078-2082.

Jia, J., et al., "A Comparison of the Mechanical Properties of Fibers Spun From Different Carbons Nanotubes," Carbon, 2011, vol. 49, pp. 1333-1339.

Jiang, B., et al., "Maximum Nanotube Volume Fraction and Its Effect on Overall Elastic Properties of Nanotube-Reinforced Composites," Composites: Part B, 2009, vol. 40, pp. 21.

Mora, R.J., et al., "Properties of Composites of Carbon Nanotube Fibres," Composites Science and Technology, 2009, vol. 69, pp. 1558-1563.

Zhang, Y., et al., "Tailoring the Morphology of Carbon Nanotube Arrays: From Spinnable Forests to Undulating Foams," 2009, ACSNano, vol. 3, pp. 2157-2162.

Zhang, Y., et al., "Polymer-Embedded Carbon Nanotube Ribbons for Stretchable Conductors," 2010, Adv. Mater., vol. 22, pp. 3027-3031.

Zhao, H., et al., "Carbon Nanotube Yarn Strain Sensors," 2010, Nanotechnology, vol. 21, 305502.

Ashley, S. et al. "Designing Safer Flywheels," Mechanical Engineering, 1996, vol. 118, No. 11, pp. 88-91.

Barber, A.H. et al., "Stochastic Strength of Nanotubes: An Appraisal of Available Data," Composites Science and Technology, 2005, vol. 65, pp. 2380-2384.

Basinger, S.A., et. al. "Amplitude-Dependence of Magnetic Stiffness in Bulk High-Temperature Superconductors," Appl. Phys. Lett., 1990, vol. 57, pp. 2942-2944.

Bradford, P.D., et al., "A Novel Approach to Fabricate High Volume Fraction Nanocomposites With Long Aligned Carbon Nanotubes," Compo Sci. Technol., 2010, vol. 70, pp. 1980-19.

Cebeci, H., et. al., "Multifunctional Properties of High Volume Fraction Aligned Carbon Nanotube Polymer Composites With Controlled Morphology," Comiposites Science and Technol, Aug. 19, 2009.

Chae, H.G., et al., "Stabilization and Carbonization of Gel Spun Polyacryolonitrile/Single Wall Carbon Nanotube Composite Fibers," Polymer, 2007, vol. 48, pp. 3781-3789.

Chae, H.G., et al., "Making strong fibers," Science, 2008, vol. 319, pp. 908-909.

Coleman, J.N., et al., "Small But Strong: A Review of the Mechanical Properties of Carbon Nanotube-Polymer Composites," Carbon, 2006, vol. 44, pp. 1624-1652.

Cumings, J. and Zettl, A., "Low-Friction Nanoscale Linear Bearings From Multiwall Carbon Nanotubes," Science, 2000, vol. 289, pp. 602-604.

Dumitrica, T., et al., "Selective Cap Opening in Carbon Nanotubes Driven by Laser-Induced Coherent Phonons," Physical Review Letters, 2004, vol. 92, No. 11.

Sun, X. and Zhao, W., "Prediction of Stiffness and Strength of Single-Walled Carbon Nanotubes by Molecular-Mechanics Based Finite Element Approach," Materials Science and Engi, 2004.

Švrček, V., et al., "Filling and Capping Multiwall Carbon Nanotubes With Silicon Nanocrystals Dispersed in SiO2-Based Spin on Glass," J. Appl. Phys., 2006, vol. 99 064306.

Unger, R. and Keiter, D., "The Development of Cryotel™ Family of Coolers," AIP Conf. Proc. 2004, vol. 719, pp. 1404-1409.

Wardle, B.L., et al., "Fabrication and Characterization of Ultrahigh-Volume-Fraction Aligned Carbon Nanotube-Polymer Composites," Adv. Mater., 2008, vol. 20, pp. 2707-2714.

Wei, C., et al., "Tensile Strength of Carbon Nanotubes Under Realistic Temperature and Strain Rate," Physical Review B, 2003, vol. 67, 115407.

Weinberger, B.R., et al., "Low Friction in High Temperature Superconductor Bearings," Appl. Phys. Lett., 1991, vol. 59, pp. 1132-1134.

Yakobson, B.I., et al., "High Strain Rate Fracture and C-Chain Unraveling in Carbon Nanotubes," Computational Materials Science, 1997, vol. 8 pp. 341-348.

Yu, M., et al., "Strength and Breaking Mechanism of Multiwalled Carbon Nanotubes Under Tensile Load," Science, 2000, vol. 287, p. 637.

Yu, M., et al., "Controlled Sliding and Pullout of Nested Shells in Individual Multiwalled Carbon Nanotubes," J Phys. Chem. B, 2000, vol. 104, pp. 8764-8767.

Zhang, X., et al., "Ultrastrong, Stiff, and Lightweight Carbon-Nanotube Fibers," 2007, Adv. Mater., vol. 19, pp. 4198-4201.

Hull, "Levitation Applications of High-Temperature Superconductors," High Temperature Superconductivity 2: Engineering Applications, (ed.) A. V. Narlikar, Springer, Berlin (2004), pp. 91-142.

* cited by examiner

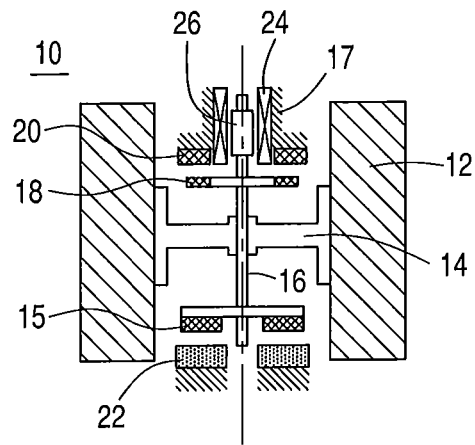
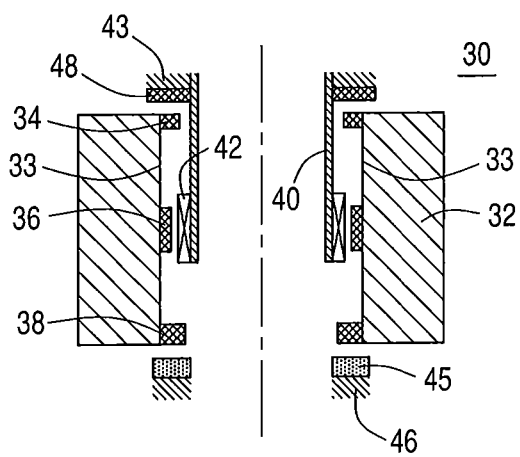
FIG. 1a  FIG. 1b
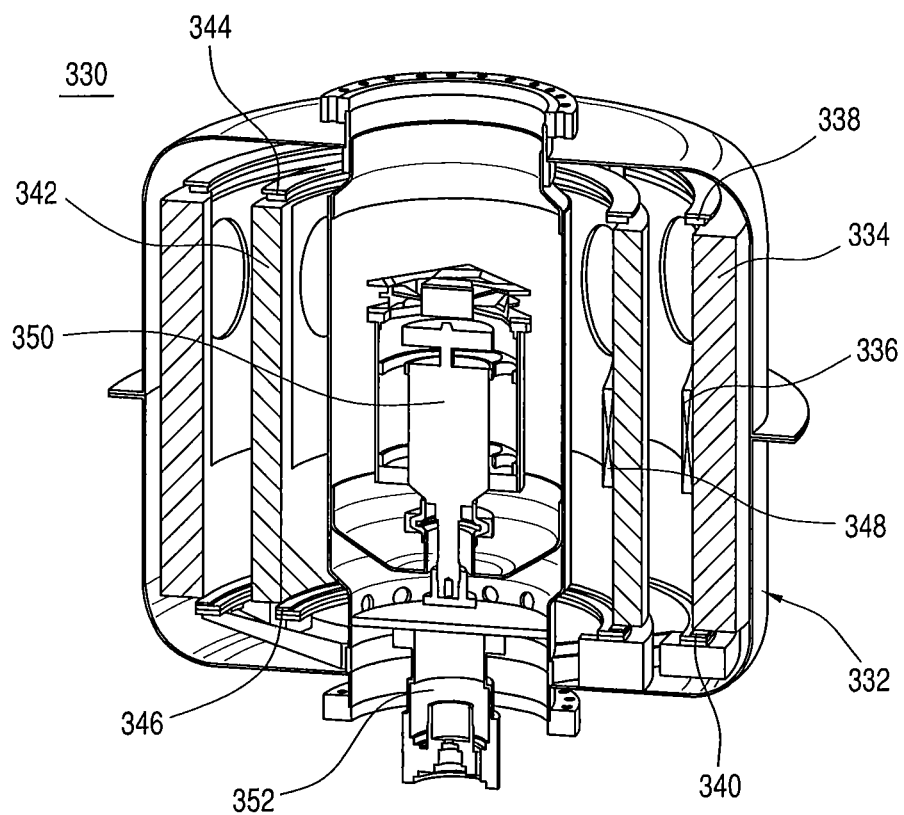
FIG. 2

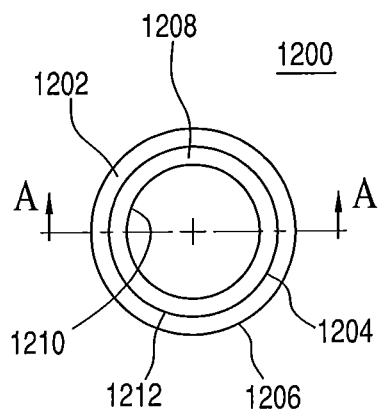
FIG. 3
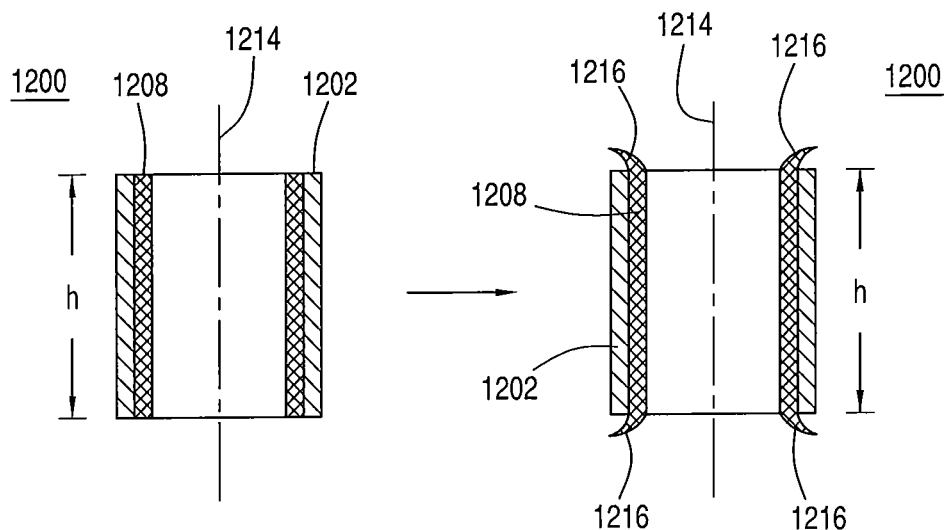
FIG. 4a
FIG. 4b

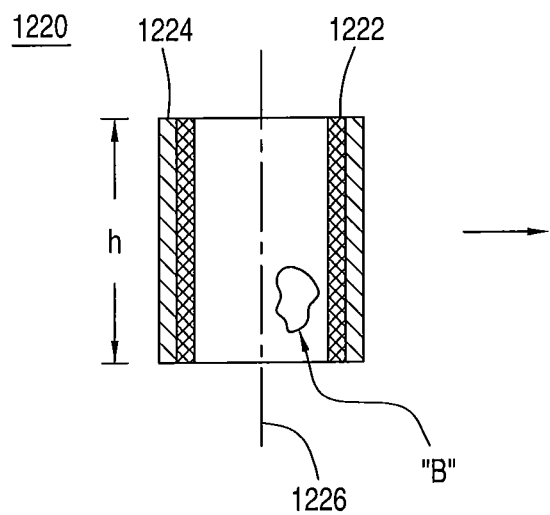
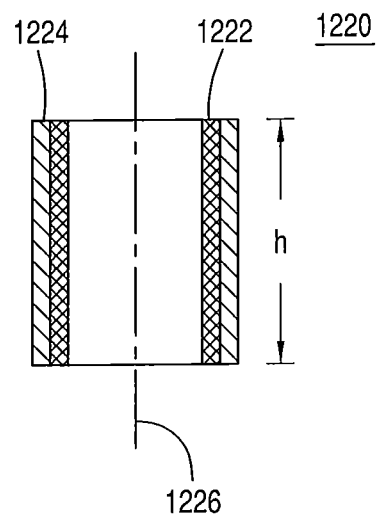
FIG. 5a    FIG. 5b
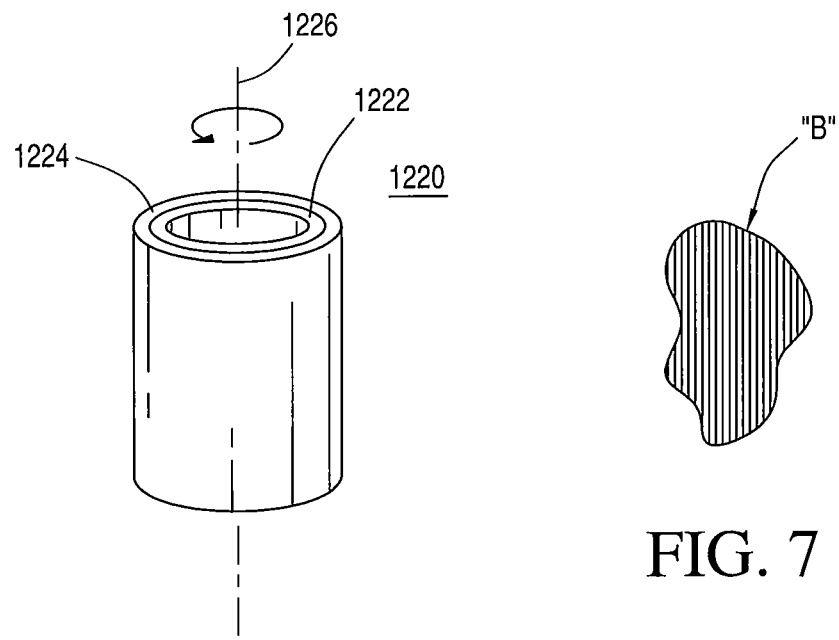
FIG. 6    FIG. 7

FLEXIBLE MAGNET DIRECTIONAL STIFFENING METHODS

TECHNOLOGICAL FIELD

The present disclosure relates to flywheel energy storage devices and, more particularly, to hubless, or open-core flywheel storage devices having improved stability and performance.

BACKGROUND

Flywheel energy storage devices and systems are known for storing energy and releasing stored energy on demand. Known flywheel assemblies have a traditional rotor design sometimes made with carbon fiber composites. Such rotors have a shaft on which the motor/generator (M/G) and bearing permanent magnets (PMs) are mounted. The shaft is conventionally connected to the rim via a hub. The shaft-and-hub flywheel design is limited in terms of its achievable upper-end velocity. Matching useable materials for components in the flywheel assembly has been problematic since the radial growth and dimension of the components varies as the rotor velocity increases. The hub must mechanically couple the shaft to the rim without introducing bending modes into the rotor structure through the range of operating frequencies in the operating speed range of the flywheel. However, the shaft often exhibits negligible radial growth while the rim exhibits significant radial growth.

Therefore, the higher speeds for flywheels enabled by the use of ever-advancing materials unfortunately exacerbates the growth-matching problem for the flywheel components as the increased radial growth of the rotor outpaces any growth exhibited by other connected components such as, for example, the connecting shaft, and/or other rotating components attached to the rotor, such as, for example, the permanent magnets (PMs). Further, the overall efficiency afforded by flywheel technology is limited by the presently available materials that often fail when the flywheel is run at speeds that exceed material tolerances.

In addition, higher rotational speeds desired by present and next-generation flywheels will cause the premature failure and otherwise inhibit optimal performance of certain component parts in the flywheel assembly. One significant area of concern is the magnets that are critical to the flywheel operation. Ceramic-type magnets have been used in flywheel assemblies. However, such magnets have not been practical at higher rotational speeds due to their inherent characteristics including, but not limited to, their brittleness, for example. Therefore, as rotational flywheel speeds increase, various magnet types are needed. Known ceramic magnets are generally limited to circumferential velocities of less than about 300 m/s. Magnets having desirable properties, including their ability to expand as the rotor material itself expands in operation at very high speeds would be desirable. However, such magnet sheets can be too pliable, leading to a condition known as "creep" or "flow" whereby the dimension of the magnet sheet can change dimension unpredictably and non-uniformly, and undesirably and unpredictably extrude and/or extend beyond the dimension of the rotor in an uncontrolled manner. Such creep depends on the material properties of the magnet sheets, but it is likely to occur at circumferential velocities that exceed about 500 m/s.

BRIEF SUMMARY

The present disclosure is directed to a flywheel assembly for storing and releasing energy comprising a preferably hollow, substantially cylindrical, rotor assembly comprising a rotor having an inner and outer surface, a stator assembly in close proximity with the rotor assembly, and at least one rotor magnet affixed to the inner surface of the rotor. The rotor magnet or magnets comprise(s) an effective amount of magnetic powder in a binding medium with an effective amount of fiber-containing material oriented to impart predictable and preselected directional stiffness to the magnet. A plurality of stator magnets are affixed to the stator and the rotor magnets and stator magnets are positioned relative to one another to facilitate levitation of the rotor during operation. Preferably, the rotor magnets experience a dimensional change of from about 0% to less than about 1% in a longitudinal direction while substantially simultaneously allowing for radial expansion of from about 1% to about 50% at circumferential velocities greater than from about 500 m/s to about 3000 m/s.

A further variation of the present disclosure is directed to a rotor magnet for use in a flywheel assembly. The rotor magnet or magnets are affixed to a flywheel rotor and comprise an effective amount of magnetic powder in a binding medium with an effective amount of fiber-containing material. The fiber-containing material is selected and oriented to impart predictable and preselected directional stiffness to the magnet. Preferably, the rotor magnet experiences a dimensional change in the longitudinal direction of from about 0% to less than about 1% in a longitudinal direction while substantially simultaneously allowing for radial expansion of from about 1% to about 50% at circumferential velocities greater than from about 500 m/s to about 3000 m/s. The magnets according to variations of the present disclosure additionally provide a more uniform field even at high circumferential velocities than known magnets.

Still further, the present disclosure is directed to a method for storing energy for subsequent release upon demand comprising the steps of providing a hollow substantially cylindrical rotor assembly comprising a rotor having an inner and outer surface, providing a stator assembly in close proximity with the rotor assembly, and affixing at least one rotor magnet to the inner surface of the rotor. The rotor magnet or magnets are affixed to a flywheel rotor and comprise an effective amount of magnetic powder in a binding medium with an effective amount of fiber-containing material. The fiber-containing material is oriented to impart predictable and preselected directional stiffness to the magnet and the rotor magnet experiences a dimensional change of from about 0% to less than about 1% in a longitudinal direction while substantially simultaneously allowing for radial expansion from about 1% to about 50% at circumferential velocities greater than from about 500 m/s to about 3000 m/s. At least one stator magnet is affixed to the stator, and the rotor magnets and stator magnets are positioned relative to one another to facilitate levitation of the rotor during operation.

In preferred variations, the flywheel assemblies of the present disclosure have particular usefulness as a sustainable power source for stationary as well as mobile uses, including manned and unmanned vehicles such as, for example, aircraft, spacecraft, and terrestrial and surface and sub-surface water-borne vehicles.

BRIEF DESCRIPTION OF THE DRAWINGS

Having thus described variations of the disclosure in general terms, reference will now be made to the accompanying drawings, which are not necessarily drawn to scale, and wherein:

FIG. 1(a) is a cross-sectional view of a shaft-and-hub flywheel assembly;

FIG. 1(*b*) is a cross-sectional view of an open-core flywheel assembly;

FIG. 2 is a cut-away view showing multiple nested rotors contained in an open-core architecture of a flywheel;

FIG. 3 is an overhead plan view of a rotor with a PM in place;

FIGS. 4(*a*) and 4(*b*) are schematic side cross-sectional views taken along line A-A' of FIG. 3 showing the rotor before rotation FIG. 4(*a*) and during/after high speed rotation FIG. 4(*b*) with conventional PM in place;

FIGS. 5(*a*) and 5(*b*) are schematic side cross-sectional views showing the rotor before rotation FIG. 5(*a*) and during/after high speed rotation FIG. 5(*b*) with improved flexible composite PM in place;

FIG. 6 is a schematic perspective view of the rotors of FIGS. 5(*a*) and 5(*b*) showing the rotational motion; and FIG. 7 is a close up view of a section "B" from FIG. 5(*a*) of flexible composite magnet.

DETAILED DESCRIPTION

Some additional variations of the present disclosure will now be described more fully hereinafter with reference to the accompanying drawings, in which some, but not all variations of the disclosure are shown. Indeed, the present disclosure may be embodied in many different forms and should not be construed as limited to the variations and alternatives set forth herein. Instead, these illustrative variations are provided so that this disclosure will be thorough and complete, and will fully convey the scope of the disclosure to those skilled in the art. For example, unless otherwise indicated, referencing something as being a first, second or the like should not be construed to imply a particular order. Also, something may be described as being "above" something else and, unless otherwise indicated, may instead be "below", and vice versa. Similarly, something described as being to the left of something else may instead be to the right, and vice versa. Like reference numerals refer to like elements throughout.

FIG. 1(*a*) shows a cross-sectional view of a traditional shaft-and-hub flywheel assembly 10 that displays limited performance at, for example, various frequencies and higher speeds. A fiber-composite rim rotor 12 is attached to hub 14 that, in turn, is attached to shaft 16. Sintered permanent magnets (PMs) 15, and 18 exert attractive and repulsive forces on a lift PM 20 and a high temperature superconductor 22 that are attached to shaft 16. PM 20 is shown attached to support 17. A stator coil 24 from the motor/generator (M/G) is shown suspended between the M/G PM 26 and support 17.

FIG. 1(*b*) shows a cross-sectional view of a flywheel architecture 30 made according to the present disclosure. In this "hubless" open-core flywheel architecture (with dot-dashed line indicating a centerline), elastic permanent magnets (PMs) 34, 36 and 38 are shown affixed to a fiber-composite rim rotor 32. Lift bearing stator PM 48 and stator coil 42 from the motor/generator (M/G) are attached to support structure 43. High temperature superconductor (HTS) 45 is positioned proximate to support 46. PMs 48 and 34 comprise the lift bearing, and elements 45 and 38 comprise the stability bearing.

The open-core architecture of the present disclosure presents a novel design that enables the fiber-composite rim and the HTS bearing to achieve maximum performance without the design limitations of component radial growth disparities inherent in the shaft-and-hub flywheel design. It is understood that the entire open-core flywheel 30 in its shown vertical orientation, is contained within a vacuum chamber (not shown). In a preferred vertical orientation, the ring-shaped rotor 32 is preferably suspended by a passively stable magnetic bearing comprising a lift bearing PM 34, 48 at one end or "top" and a HTS stability bearing 38, 45 at a second end, or "bottom". Preferably, a brushless PM motor/generator 36, 42 delivers power in and out of the rotor. As shown in FIG. 1(*b*), the rotor PMs 34, 36 and 38 are positioned along the inner surface of the rotor 32. The coldhead of a small cryocooler (not shown) thermally conducts to the HTS 45 to maintain a desired temperature of from about 30 K to about 90 K, and preferably about 60 K. A small turbo-molecular or getter-sublimation pump (not shown) maintains the vacuum inside the chamber.

For example, as shown in FIG. 2, a flywheel assembly 330 within a vacuum chamber having a chamber wall 332 comprises a first, or outer rotor 334 having an outer rotor radius with an outer brushless PM M/G stator 336 associated with the outer rotor 334. An outer PM lift bearing 338 is located above outer rotor 334, and an outer HTS bearing 340 is located below outer rotor 334. Inner rotor 342 has an inner rotor radius that is less than the outer rotor radius, and is therefore positioned at a location radially inward from the outer rotor 334. Inner PM lift bearing 344 and inner HTS bearing 346 are shown positioned respectively above and below the inner rotor 342. Inner brushless PM M/G stator 348 is shown located radially inward from inner rotor 342. A cryocooler 350 is shown located near the center of the flywheel assembly 330, positioned above a vacuum pump 352. The vacuum pump 352 is preferably a small turbo-molecular pump or getter-sublimation pump. A coldhead (not shown) of a small cryocooler thermally conducts to the HTS bearings 340, 346 to keep them at a preferred operating temperature of from about 30 K to about 80 K.

In one variation, the vacuum chamber constitutes a significant portion of the weight of the flywheel assembly. Incorporating multiple nested rotors improves overall system energy and volume density, although it is understood that the rotor magnets of the present disclosure also may be used with single rotor flywheel assemblies that may or may not have open-core (hubless) architectures. In an alternative, a dual-rotor configuration, such as that shown in FIG. 2, the rotors are operated independently as independent flywheels. The inner rotor preferably has a maximum rim velocity that is significantly similar to the outer rotor, but will have a higher maximum rpm by design.

In addition, more than two rotors may be incorporated in the same vacuum chamber, further increasing the energy density of the flywheel assembly, with more than one flywheel sharing the same vacuum chamber. By being housed in the same vacuum chamber, the inner rotors essentially share a vacuum pump and cryocooler, etc., further reducing the required footprint for the flywheel system. The nesting of multiple rotors within one flywheel assembly can best be accomplished in an open-core architecture.

In a two-rotor configuration, operating the two rotors in opposite directions reduces the net angular momentum of the total system and further facilitates transit of the flywheels operating at high speeds. If the two counter-rotating rotors have substantially the same rim velocity, radial thickness and height, the outer rim will have greater kinetic energy and angular momentum than the inner rotor. In this case, the angular momentum cannot be completely cancelled. However, according to a further variation, angular momentum is cancelled by altering the height and/or radial thickness of the inner rotor. Radial thickness is often governed by the ability to address radial stress, whereas height is a parameter with fewer constraints.

Further, if design constraints for a desired flywheel system were to necessitate that both inner and outer rotor maintain the same the same height, the present disclosure contemplates incorporating a third rotor. In this design, angular momentum may be completely negated by rotating two rotors (preferably the two inner rotors) in the same direction and rotating the remaining rotor in the opposite direction, for example. In each of the aforementioned scenarios and designs with multiple nested rotors, the kinetic energy of the rotors are added together to obtain the flywheel system's total system kinetic energy. Variations of the present disclosure are particularly advantageous in that the open-core architecture allows the vacuum pump and cryocooler to reside in the substantially cylindrical space inside the innermost rotor, thereby reducing the overall volumetric footprint of the system as compared to mounting these components on the top or bottom of the vacuum boundary. The rotor, bearing components and M/G stator are enclosed by a steel vessel that is evacuated to vacuum. Initial evacuation of the chamber is effected by any suitable pump, such as, for example, a roughing pump. The roughing pump may be removed, with the chamber then continually evacuated by a 70 $ls^{-1}$, 24Vdc turbomolecular pump, for example, and preferably an associated backing pump.

The use of the HTS bearing is important to the flywheel system disclosed herein, and allows the flywheel rotor to rotate at high velocity and take advantage of the benefits of the open-core architecture. The HTS bearing remains passively stable so long as the temperature of the HTS components remains below 80 K. The heat capacity of the HTS combined with low heat leak into the HTS results in the ability to maintain a sufficiently low temperature to keep stability and operate the bearing.

This configuration is similar to the stator component of a superconducting stability bearing used in a 5-kWh, 3-kW flywheel assembly as reported in Materials Science and Engineering B 151 (2008) 195-198 M. Strasik, J. R. Hull, P. E. Johnson, J. Mittleider, K. E. McCrary, C. R. McIver, A. C. Day, *Performance of a Conduction-cooled High-temperature Superconducting Bearing*. As indicated by the experimental bearing loss values, the presence of the copper thermal bus under the HTS elements did not significantly increase the bearing loss. The gap is the distance between the bottom of the flywheel rotor magnet and the top of the HTS crystals. A gap of from about 2 mm to about 4 mm is preferred for the HTS bearing. The rotational loss in an HTS bearing is proportional to $(\Delta B)^3/Jc$, where $\Delta B$ is the inhomogeneity of the magnetic field of the PM component measured in the rotational direction, and Jc is the critical current density in the HTS.

For the HTS bearing to operate optimally, the stator part of the bearing preferably must be kept at cryogenic temperatures of lower than about 80 K, and more preferably from about 30 K to about 80 K. This is accomplished by establishing a flexible mechanical connection with high thermal conductance between the support base for the bulk HTS and the coldhead of a cryocooler. One preferred cryocooler contemplated for inclusion in the preferred flywheel systems disclosed is the Sunpower Cryotel™ (SunPower Inc., Athens, Ohio). The preferred cryocooler is a linear, free-piston, integral Stirling-cycle machine that uses air bearings and has no friction-based failure modes, and has the ability to provide up to about 15 W of cooling at about 77 K. In addition, the preferred cryocooler has the ability to throttle input power when less cooling is required, and should provide cooling to the HTS bearing for flywheel sizes up to about 100 kWh.

Further, the M/G works as a conventional radial-gap brushless design in that in motor mode currents pass through the stator coils in a timed manner to interact with the magnetic field of the rotor PMs to produce torque. In generator mode, the magnetic flux of the rotating PMs sweeps through the stator coils and produces voltage according to Faraday's law. At low speeds, a Hall-effect sensor measures the magnetic field from the M/G PMs to control the timing of the stator currents. At high speeds, the back electromagnetic field on the coils provides the input for this control. In a conventional radial-gap M/G, the stator coil is typically located radially outward from the PMs. However, according to preferred variations of the present disclosure, in the preferred open-core design, the locations are reversed, with the stator coils located radially inward of the PMs, as shown in FIG. 1(*b*).

According to the present disclosure, incorporating into an open-core flywheel architecture, rotor materials having significantly improved strength/density ratios, including preferred MWCNTs will increase energy densities from presently known values of about 264 Wh/kg to at least about 473 Wh/kg, and a commensurate increase of and fiber tensile strength of from about 11 to about 63 GPa (an increase in efficiency and strength of at least about 80% from known devices). Indeed, when wall thickness of the MWCNTs is normalized to the physical wall thickness of about 0.075 nm, theoretical wall strengths of at least about 300 GPa are achievable. It is further understood that single-walled CNTs (SWCNTs) are also contemplated by variations of the present disclosure and may be incorporated into the rotor components of the inventive flywheel assemblies presented herein, since SWCNTs may provide adequate or even superior mass efficient reinforcement. A typical SWCNT has a diameter of about 1.35 nm. Using this diameter with a 1 atom interatomic spacing Vfs of only 39% are achievable. A diameter of 3 nm would yield Vfs of 60%. It is understood that the optimal CNTs for use in connection with variations of the present disclosure balance CNT diameter, achievable Vf, and efficiency of the CNT reinforcement.

As explained above, in a hubless flywheel design, such as, for example, an "open-core" flywheel architecture, a substantially cylindrical rotor or "tube" is rotated about a preferably longitudinal axis at high speed, thereby storing kinetic energy. This kinetic energy is then delivered out of the flywheel system via a generator to produce and deliver electricity. As is well known in the field of flywheel technology, as the rotational rate increases, the rotor will expand radially. To remain in contact with the rotor and remain useful to the flywheel assembly, the rotor magnet must remain in contact with the rotor surface. Therefore, to remain in contact with the dimensionally (radially) expanding rotor, the rotor magnet or magnets must also expand dimensionally (radially), substantially in concert with the rate of expansion experienced by the rotor.

Flexible magnets, such as, for example, rubber or rubberized magnets have been tried for use as rotor magnets in flywheel assemblies. However, at desired flywheel rotational speeds (circumferential velocities), the flexible rubberized magnets begin to expand or "flow" or "creep" in a dimensionally unpredictable fashion. This dimensionally unpredictable magnet flow leads to a loss of the magnet and/or adequate magnetization from the flywheel assembly. In addition, this magnet flow, at high speeds, can lead to an imbalanced rotor, and eventually lead to a catastrophic failure of the rotor and the entire flywheel assembly.

Variants of the present disclosure contemplate incorporating oriented fibers, such as, for example, axially oriented fibers in a flexible rotor magnet composition. The type, concentration and characteristics of the axial fibers selected allow the magnet to expand dimensionally in a predetermined and predictable fashion. In this way, according to the present disclosure, axially oriented fibers are added to the magnet to predictably allow the rotor magnet to substantially match the dimensional expansion (such as, for example, radially) of the rotor, thus enabling the rotor magnet to maintain critical contact with the rotor surface, and to only expand to a desired and predetermined dimension.

FIG. 3 shows an overhead plan view of a cylindrical rotor assembly 1200. Rotor 1202 has an inner wall 1204 and an outer rotor wall 1206. Magnet 1208 has an inner wall 1210 and an outer wall 1212. As shown, magnet outer wall 1212 is in intimate contact with, and preferably affixed to the rotor inner wall 1204. FIG. 4(a) is a cross-sectional view of the cylindrical rotor assembly 1200 of FIG. 3 taken across line A-A' in a stationary position, or before rotational forces have applied thereto. The rotor 1202 and magnet 1208 have a substantially matching longitudinal dimension, or height "h". The rotor assembly 1200 rotates about centerline 1214.

FIG. 4(b) shows a cross-sectional view of the cylindrical rotor assembly 1200 of FIGS. 3 and 4(a) after the assembly 1200 has been subjected to a rotational force at high speed (such as, for example, a high circumferential velocity exceeding about 500 m/s). A portion of magnet 1208 is shown extruded and extending longitudinally at points 1216 to a dimension exceeding the dimension or height "h". Stated another way, portions of the magnet "creep" or "flow" or otherwise extrude from the magnet itself to a point beyond the height of the rotor 1202.

FIGS. 5(a) and 5(b) show cross sectional views whereby a rotor assembly 1220 comprises rotor magnet 1222 shown in intimate contact with rotor 1224. FIG. 5(a) shows the rotor assembly 1220 at rest before it rotates in operation about centerline 1226. FIG. 5(b) represents the rotor assembly 1220 of FIG. 5(a) after or during rotation at high speeds. No "flow" or creep of the magnet beyond the height "h" of the rotor occurs. FIG. 7 is an enlarged cutaway "B" from FIG. 5(a) showing a representative close-up view of the oriented fibers present in the rotor magnet 1222 that preserve dimensionally stability of the magnet to prevent "flow", even at high circumferential velocities greater than 500 m/s. FIG. 6 shows a perspective view of the substantially cylindrical rotor 1220 of FIGS. 5(a) and (b) rotating about centerline (axis) 1226.

As shown in FIGS. 3-7, the present disclosure contemplates positioning a bonded or rubberized permanent magnet (PM) layer along the full height and indeed, complete inner surface of the inner circumference of the rotor. In other words, a bonded magnet sheet preferably substantially completely lines the inner surface of the rotor. Preferably, the sheet extends the full length (longitudinal length, or "height") of the rotor so as to not produce stress concentrations. According to one preferred variant, the rotor has a longitudinal length substantially equivalent to the rotor magnet longitudinal length, such that the rotor magnet substantially extends to the full length of the rotor. This desirable and preferred arrangement allows the rotor to achieve increased circumferential velocities of from about 1000 m/s to about 3000 m/s, resulting in a higher energy density for the flywheel system. The PM layer is selectively magnetized to perform the same functions as the discrete PMs for a lift bearing, stability bearing and motor/generator in the flywheel assembly. However, it is understood, that, if desired, the improved flexible magnets of the present disclosure could be applied to the inner wall of the rotor in any configuration, as desired, that effects less than complete coverage of the rotor's inner wall surface.

It is preferred the flexible magnets of the present disclosure comprise a magnetic powder introduced into a binder along with the oriented fibers. The magnetic powder used to make the flexible rubberized magnets (preferably sheets) according to variations of the present disclosure can be any magnetic powder that is traditionally used in magnet fabrication. Magnet powders include neodymium iron boron, samarium cobalt, strontium hexaferrite and barium hexaferrite, with neodymium iron boron powder being particularly preferred.

The rubber sheet matrix binder is made from any suitable material including rubber-, epoxy- and nylon-containing materials, preferably admixed with a carbon fiber, graphite, fiber glass, carbon nanotube (CNT), organic fibers, such as, for example ultra high molecular weight polyethylene (UHMWPE), polybenzobisoxazole (PBO), aramids, ceramics such as SiC, boron, BN, etc., or metal fibers derived from stainless steel, titanium, aluminum or high strength alloys. Particularly preferred binders include polyurethane, polyamides, thermoplastic materials such as, for example, polyethylene (PE), polypropylene (PP), high density polyethylene (HDPE), polyetheretherketone (PEEK), etc. Further preferred binders include thermoset compounds including, for example, low cross-linked and highly cross-linked rubbers, ethylene propylene diene monomers, urethanes, etc.

The oriented fibers can be organic fibers, such as, for example, Kevlar®, polyethylene, ultra-high-molecular weight polyethylene (UHMWPE), ceramics such as alumina, silicon carbide (SiC), boron; graphites; various fiber-glasses, etc., and combinations thereof. The fibers are oriented in the direction to best mitigate against magnet creep or flow. Fibers are oriented longitudinally to best mitigate against longitudinal creep of flow. The fibers may be arranged slightly off axis to add the required stiffness and strength required (+/3 to 45°). As the rotor increases speed significantly, the rotor expands or "grows" radially and also changes axially. The fiber selection and angle of impregnation into the rubberized magnet matrix regulates and otherwise determines the dimensional, such as, for example, axial change in the magnet, that can be predictably matched to that of the rotor. Indeed, as compared to the known, brittle ceramic magnets that cause flywheel rotor failure due to their inability to change dimensionally, the magnets according to variations of the present disclosure are designed and tailored to predictably radially expand at high circumferential velocities at a rate of from about 1% to about 50%, while changing dimensionally in a longitudinal direction by an amount of from about 0% to about less than 1%.

It is understood that the magnets according to the present disclosure can be made by impregnating the magnetic powder with the fiber, or, through the manufacture of laminate layers, adding fibers to the rubber sheet material. The type of fiber selected can be chosen depending on the desired application and can be woven, for example, plain weave, satin, etc. With regard to warp and weft, the tows can be the same of different, and may therefore incorporate multiple materials into one resulting fabric. The fibers may undergo an optional surface treatment such as, for example, laser ablation, UV treatment, acid etches, plasma treatment, etc. Further, optional coupling agents may be provided such as, for example, silanes, titanates, zirconates, etc.

The thickness of the composite layers will depend on the desired final thickness of the magnet sheets. The thickness of the final magnet sheet will depend upon its intended use, such as, for example, within a flywheel rotor. For a flywheel assembly according to the present disclosure, the magnetic powders have a preferred diameter of from about 1-2 µm. The fibers preferably have a diameter of from about 1 µm to about 10

μm. Together, the powder and fiber layers have a thickness of from about 1-2 mm, and the rubber sheet has an overall desired thickness of from about 0.1 to about 10 mm, and more preferably from about 1-2 mm, depending on the constraints of the desired end use.

The actual manufacturing method selected for the magnet includes spray deposition (for example, for use with chopped fibers useful, for example, for fiber glass manufacture and processing); molding (particularly useful for the manufacture of a seamless magnet for insertion into a cylindrical flywheel rotor); laminate processes conducted, for example, on a table or wound on a drum with tows of fibers wound around drum and cut longitudinally to produce a cylindrical magnet, etc.

According to the present disclosure, the rotors preferably comprise high-strength materials such as, for example, carbon fiber-containing, glass fiber-containing, metal-containing materials and combinations thereof, etc. Carbon nanotubes (CNTs)-containing materials are particularly preferred. Such materials are allotropes of carbon with a cylindrical nanostructure. Nanotubes have been constructed with length-to-diameter ratio of up to 132,000,000:1, significantly larger than for any other material. These cylindrical carbon molecules have unusual properties that are valuable for nanotechnology, electronics, optics and other fields of material science and technology. Because of their thermal conductivity and mechanical and electrical properties, carbon nanotubes find applications as additives to various structural materials. Nanotubes are categorized as single-walled nanotubes (SWNTs) and multi-walled nanotubes (MWNTs). Individual nanotubes naturally align themselves into "ropes" held together by van der Waals forces, more specifically, pi-stacking.

The preferred CNTs used in the present disclosure are specifically formulated by controlling the degree of orientation and volume fraction in a matrix to afford the finished composite material and product desired physical properties (such as, for example, higher rotor tensile strengths) than are presently known.

According to variations disclosed herein, incorporating into an open-core flywheel architecture, rotor materials having significantly improved strength/density ratios, including preferred MWCNTs will increase flywheel rotor energy densities from presently known values of about 264 Wh/kg to at least about 473 Wh/kg, and a commensurate increase of and fiber tensile strength of from about 11 to about 63 GPa (an increase in efficiency and strength of at least about 80% from known devices). Indeed, when wall thickness of the MWCNTs is normalized to the physical wall thickness of about 0.075 nm, theoretical wall strengths of at least about 63 GPa are achievable. It is further understood that single-walled CNTs (SWCNTs) are also contemplated and may be incorporated into the rotor components of the inventive flywheel assemblies presented herein, since SWCNTs may provide adequate or even superior mass efficient reinforcement. A typical SWCNT has a diameter of about 1.35 nm. Using this diameter with a 1 atom interatomic spacing Vfs of only 39% are achievable. A diameter of 3 nm would yield Vfs of 60%. It is understood that the optimal CNTs, for use in connection with the present disclosure, balance CNT diameter, achievable Vf, and efficiency of the CNT reinforcement.

According to preferred variations, most of the flywheel rotor comprises a filament-wound fiber composite that is magnetically levitated by a HTS bearing. The HTS bearing comprises a PM rotor and HTS stator. Because of the superconducting properties of the HTS stator, the levitation is passive, requiring no significant feedback or active controls. The HTS stator preferably comprises an array of individual HTS crystals of Y—Ba—Cu—O, or other materials where Y is replaced by other rare earth elements such as, for example, Gd, Nd, Eu, etc., that are cooled by thermal conduction to the coldhead of a cryocooler to a temperature of from about 70 K to about 80 K. Preferably no cryogenic fluids (for example, liquid nitrogen, etc.) are required for bearing operation. The brushless M/G comprises a PM rotor and a stator preferably comprising copper windings in a ferromagnetic yoke. M/G stator cooling is accomplished by thermal conduction to the vacuum chamber walls. No parasitic energy is required for this function. An energy-absorbing containment liner is placed between the rotating flywheel and the outer vacuum shell. It is preferred to keep the weight of both the vacuum chamber, and the stationary components inside the vacuum chamber to a minimum to meet the energy density requirements of the flywheel array. Other major components of the preferred system include a lift bearing, a touchdown bearing, and power electronics.

Useful applications for the flywheel systems disclosed herein abound. Indeed, any required need for sustainable energy storage and deployment would find use and benefit from the present disclosure. In preferred variations, the flywheel assemblies have particular usefulness as a sustainable power source for use in manned and unmanned vehicles including, but not limited to, aircraft, spacecraft, and terrestrial and surface and sub-surface water-borne vehicles. For example, due to the substantially silent operation of the flywheel systems of the present disclosure, manned or unmanned vehicular operation in silent or stealth modes are made possible. In addition, the presently disclosed systems allow for rapid charging and discharging, as well as charging from all available energy sources such as, for example, grids, renewables, generators, etc. Further, no unique tooling or infrastructure is required to incorporate the variations disclosed into stationary or mobile devices, systems or vehicles requiring uninterruptable and interruptible energy storage or deployment in mobile and stationary operation. The modular approach to the open-core architecture design of the variations disclosed reduce the risk of total system failure and further enable a deeper depth of energy discharge (e.g. greater than about 95%) as compared to known flywheel systems. In addition, the systems allow for the very precise determination of charge based only upon monitoring the flywheel rotational speed.

While the preferred variations and alternatives have been illustrated and described, it will be appreciated that various changes and substitutions can be made therein without departing from the spirit and scope of the disclosure. Accordingly, the scope of the disclosure should only be limited by the accompanying claims and equivalents thereof.

We claim:

1. A flywheel assembly for storing and releasing energy comprising:
   a substantially cylindrical rotor assembly comprising a rotor having an inner and outer surface;
   a stator assembly in close proximity with the rotor assembly;
   at least one rotor magnet affixed to the inner surface of the rotor, said rotor magnet comprising an effective amount of magnetic powder in a binding medium with an effective amount of fiber-containing material, said fiber-containing material oriented to impart directional stiffness to the magnet;
   a plurality of stator magnets affixed to the stator;
   wherein the rotor magnet and stator magnet are positioned relative to one another to facilitate levitation of the rotor during operation, and wherein the rotor magnets experience a dimensional change of from about 0% to less than about 1% in a longitudinal direction at circumferential velocities of from about 500 m/s to about 3000 m/s.

2. The flywheel assembly of claim 1, wherein the rotor magnet comprises a magnetic powder selected from the group consisting of: neodymium iron boron, samarium cobalt, strontium hexaferrite, barium hexaferrite, and combinations thereof.

3. The flywheel assembly of claim 1, wherein the rotor magnet comprises a binder selected from the group consisting of: polyurethane-containing materials, rubber-containing materials, epoxy-containing materials, nylon-containing materials, and combinations thereof.

4. The flywheel assembly of claim 3, wherein the binder is admixed with a material selected from the group consisting of: carbon-fiber-containing materials, graphite-containing materials, fiber glass-containing materials, carbon nanotube-containing materials, ceramic fibers, organic fibers, aramids, metal fibers, stainless steel, titanium, aluminum, high strength alloys, or combinations thereof.

5. The flywheel assembly of claim 1, wherein the rotor magnet comprises a binder selected from the group consisting of: polyethylene (PE), polypropylene (PP), high density polyethylene (HDPE), polyetheretherketone (PEEK), low cross-linked and highly cross-linked rubbers, ethylene propylene diene monomers, urethanes and combinations thereof.

6. The flywheel assembly of claim 5, wherein the binder is admixed with a material selected from the group consisting of: carbon-fiber-containing materials, graphite-containing materials, fiber glass-containing materials, carbon nanotube-containing materials, metal fibers, stainless steel, titanium, aluminum, high strength alloys, or combinations thereof.

7. The flywheel assembly of claim 1, wherein the rotor magnet exhibits a dimensional change radially of from about 1% to about 50% at circumferential velocities of from about 1000 m/s to about 3000 m/s.

8. The flywheel assembly of claim 1, wherein the rotor magnet has a thickness of from about 0.1 mm to about 10 mm.

9. The flywheel assembly of claim 1, wherein a plurality of rotor magnets are applied to the inner surface of the rotor.

10. The flywheel assembly of claim 1, wherein the rotor has a longitudinal length substantially equivalent to the rotor magnet longitudinal length, such that the rotor magnet substantially extends to the full length of the rotor.

11. The flywheel assembly of claim 1, wherein the flywheel assembly comprises an open-core architecture.

12. An energy storage and energy deployment system comprising the flywheel assembly of claim 1.

13. A vehicle comprising the flywheel assembly of claim 1.

14. A rotor magnet for use in a flywheel assembly, said rotor magnet affixed to a flywheel rotor, said rotor magnet comprising an effective amount of magnetic powder in a binding medium with an effective amount of fiber-containing material, said fiber-containing material oriented to impart directional stiffness to the magnet and wherein the rotor magnet experiences a dimensional change of from about 0% to less than about 1% in a longitudinal direction at circumferential velocities of from about 500 m/s to about 3000 m/s.

15. The rotor magnet of claim 14, wherein the rotor magnet comprises a magnetic powder selected from the group consisting of: neodymium iron boron, samarium cobalt, strontium hexaferrite, barium hexaferrite, and combinations thereof.

16. The rotor magnet of claim 14, wherein the rotor magnet comprises a binder selected from the group consisting of: rubber-containing material, epoxy-containing materials, nylon-containing materials, and combinations thereof.

17. The rotor magnet of claim 14, wherein the rotor magnet comprises a binder selected from the group consisting of: polyethylene (PE), polypropylene (PP), high density polyethylene (HDPE), polyetheretherketone (PEEK), low cross-linked and highly cross-linked rubbers, ethylene propylene diene monomers, urethanes and combinations thereof.

18. The rotor magnet of claim 17, wherein the binder is admixed with a material selected from the group consisting of: carbon-fiber-containing materials, graphite-containing materials, fiber glass-containing materials, carbon nanotube-containing materials, metal fibers, stainless steel, titanium, aluminum, high strength alloys, or combinations thereof.

19. The rotor magnet of claim 17, wherein the binder is admixed with a material selected from the group consisting of: carbon-fiber-containing materials, graphite-containing materials, fiber glass-containing materials, carbon nanotube-containing materials, metal fibers, stainless steel, titanium, aluminum, high strength alloys, or combinations thereof.

20. The rotor magnet of claim 14, wherein the rotor magnet exhibits a dimensional change radially of from about 1% to about 50% at circumferential velocities of from about 1000 m/s to about 3000 m/s.

21. The rotor magnet of claim 14, wherein the rotor magnet has a thickness of from about 0.1 mm to about 10 mm.

22. The rotor magnet of claim 14, wherein the system comprises an open-core architecture.

23. An energy storage and energy deployment system comprising the rotor magnet of claim 14.

24. A vehicle comprising the rotor magnet of claim 14.

25. A method for storing energy for subsequent release upon demand comprising the steps of:
  providing a substantially cylindrical rotor assembly comprising a rotor having an inner and outer surface;
  providing a stator assembly in close proximity with the rotor assembly;
  affixing at least one rotor magnet to the inner surface of the rotor, said rotor magnet affixed to a flywheel rotor, said rotor magnet comprising an effective amount of magnetic powder in a binding medium with an effective amount of fiber-containing material, said fiber-containing material oriented to impart directional stiffness to the magnet and wherein the rotor magnet experiences a dimensional change of from about 0% to less than about 1% in a longitudinal direction while substantially simultaneously allowing for radially expansion of the magnet at a rate of from about 1% to about 50% at circumferential velocities of from about 1000 m/s to about 3000 m/s; and
  providing a plurality of stator magnets affixed to the stator;
  wherein the rotor magnet and stator magnets are positioned relative to one another to facilitate levitation of the rotor during operation.

26. The method of claim 25, wherein the rotor assembly and stator assembly are contained in an open-core architecture.

* * * * *